(No Model.) 2 Sheets—Sheet 2.

A. DYER.
CULTIVATOR ATTACHMENT.

No. 514,917. Patented Feb. 20, 1894.

Witnesses. Inventor.

UNITED STATES PATENT OFFICE.

ALONZO DYER, OF ODESSA, MISSOURI.

CULTIVATOR ATTACHMENT.

SPECIFICATION forming part of Letters Patent No. 514,917, dated February 20, 1894.

Application filed November 7, 1892. Serial No. 451,393. (No model.)

*To all whom it may concern:*

Be it known that I, ALONZO DYER, a citizen of the United States, residing at Odessa, in the county of Lafayette and State of Missouri, have invented new and useful Improvements on the Cultivator Attachments for which a patent was allowed me in the United States, No. 407,079, bearing date March 24, 1892, of which the following is a specification.

My invention relates to improvements in cultivator attachments in which the attaching shaft operates with a gatherer and concaved wheel and with gatherer and (divided concave or) right and left bevel rim wheels and the objects of my improvements are, first to provide an attachment suitable to cultivate any size plants, second to provide facilities for attaching to any cultivator. I attain these objects by the mechanism illustrated in the accompanying drawings, in which—

Figure 1:
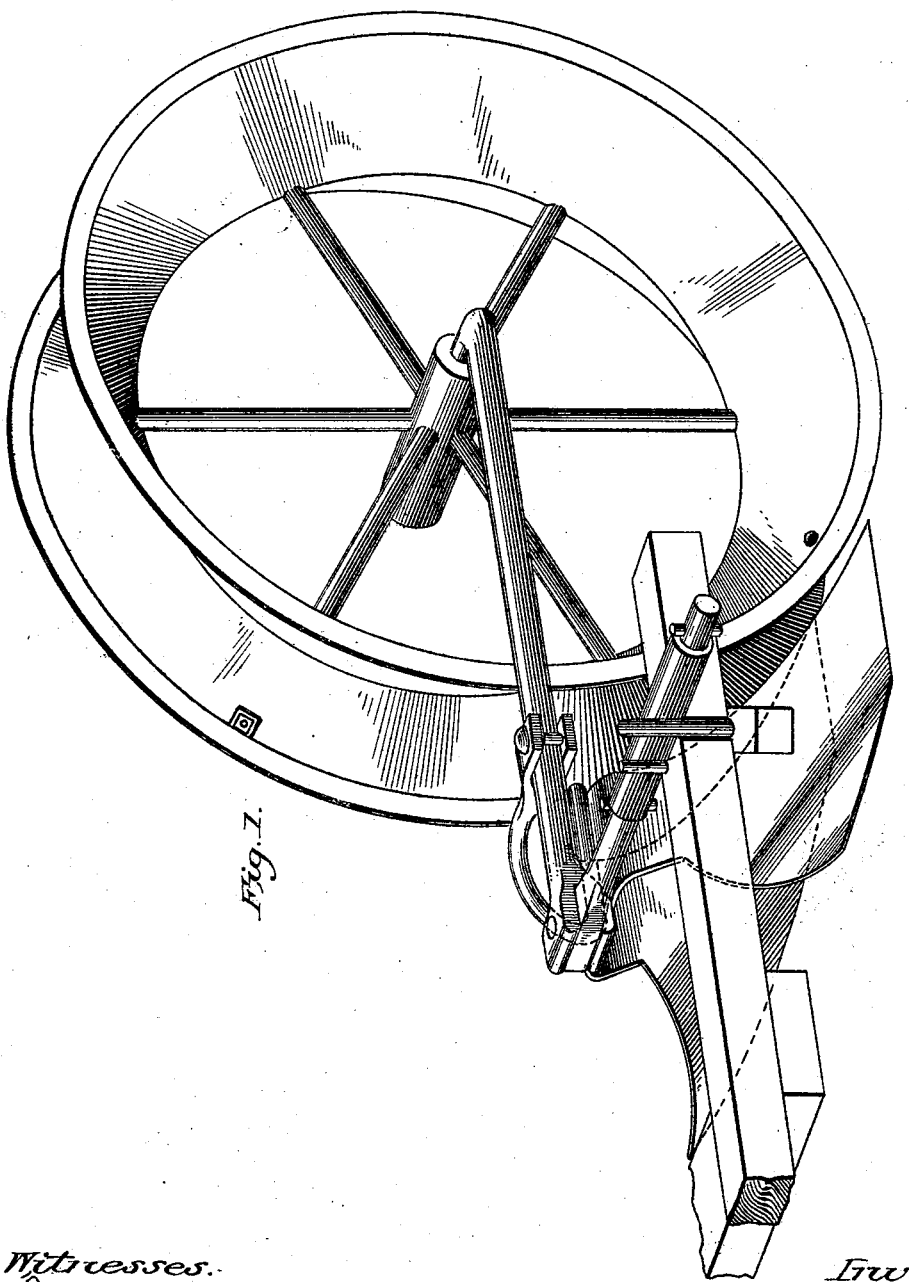
Figure 2:
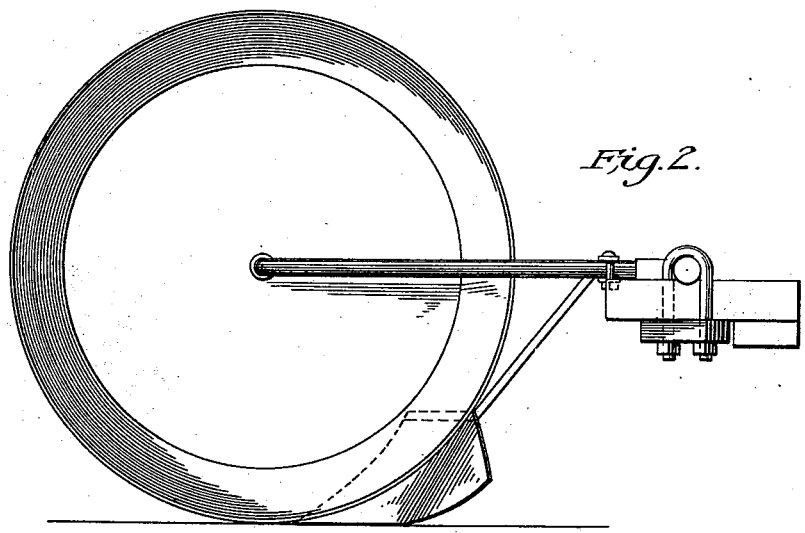
Figure 3:
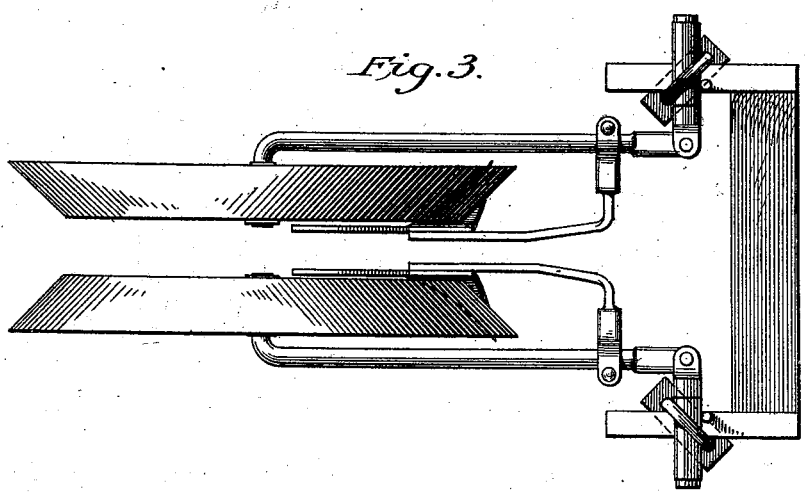

Figure 1 shows a wheel with concave rim. Fig. 2 is a side view and Fig. 3 shows a pair of beveled wheels.

The gatherer is a double triangle shaped piece with front part bent so as to gather blades and leaves of large plants under the beveled or concaved wheel connected at the top (except when attached to bevel wheel) and clasped to attaching shaft just in the rear of coupling by a small rod on the end of which is a clasp so as to be detached when not necessary to be used. The right and left extension rims are about two inches wide and are attached with bolts to the outer edge of the rim of the concaved wheel and are detachable. They raise the concaved wheel two inches thereby shielding larger plants, or the same results may be obtained by dividing the concaved wheel making right and left bevel wheels as shown by Fig. 3 of the drawings. These wheels attach to each beam of cultivator and work independent of each other. The attaching shaft is to take the place of attaching rods used on the former attachment. It provides a way for attaching a gatherer and right and left bevel rim wheels to any cultivator. It is made right or left by turning over, either will attach concaved wheel but it takes two to attach right and left bevel rim wheels. This shaft is about one inch by twenty-eight inches with about seven inches of the rear end bent square for axle of concaved or bevel rim wheel. The front end is attached in opposite direction by coupling a short shaft with boxing the same being clamped to the lower or upper side of cultivator-beam in front of front-shovels. The coupling admits of moving to the right or left and the boxing up or down.

Having fully described my invention, what I claim, and desire to secure by Letters Patent, is—

1. The combination in a cultivator attachment of a rolling fender to run on each side of a row of plants and having rims beveled outwardly, a gatherer secured closely in front of said fender and composed of two substantially vertical triangular plates each having a pointed rear end and a front portion curved outward, and adapted to run on each side of the row and gather or lift the leaves of the plants, substantially as shown and described.

2. The combination in a cultivator attachment of a fender composed of two disks having rims beveled outward, separately attached to the frame (gangs) and capable of independent vertical movement and adapted to run on each side of a row of plants, substantially as shown and described.

3. A wheel fender having a pair of disks with rims beveled outward and secured to the cultivator gangs, by rods having their ends bent at opposite right angles, the rod that attaches to the gang boxed, and coupled to the rod that passes through the wheel, and arranged to run on each side of a row of plants in combination with the gatherer attached in front of said fender and also adapted to run on each side of a row of plants, substantially as shown and described.

ALONZO DYER.

Witnesses:
N. M. HOUX,
J. H. PATTERSON.